(12) United States Patent
Fukuda

(10) Patent No.: US 6,740,003 B2
(45) Date of Patent: May 25, 2004

(54) METHOD AND APPARATUS FOR CONTROLLING A BICYCLE TRANSMISSION

(75) Inventor: Masahiko Fukuda, Amagasaki (JP)

(73) Assignee: Shimano, Inc., Sakai (JP)

(*) Notice: Subject to any disclaimer, the term of this patent is extended or adjusted under 35 U.S.C. 154(b) by 86 days.

(21) Appl. No.: 10/138,912

(22) Filed: May 2, 2002

(65) Prior Publication Data

US 2003/0207732 A1 Nov. 6, 2003

(51) Int. Cl.[7] .............................................. F16H 61/00
(52) U.S. Cl. ........................................... 477/78; 474/80
(58) Field of Search ............................. 474/69, 78, 80, 474/81, 82, 83

(56) References Cited

U.S. PATENT DOCUMENTS 5,356,348 A 10/1994 Bellio et al.
5,357,177 A * 10/1994 Fey et al. ..................... 318/3
6,340,338 B1 1/2002 Kamada

FOREIGN PATENT DOCUMENTS

JP 59-153684 9/1984
JP 10-291491 11/1998

* cited by examiner

Primary Examiner—David A. Bucci
Assistant Examiner—Vicky A. Johnson
(74) Attorney, Agent, or Firm—James A. Deland

(57) ABSTRACT

An apparatus for moving an electrically controlled bicycle derailleur from a first sprocket to a second sprocket comprises a derailleur position input for receiving a signal indicating a position of the derailleur; a memory storing a first reference derailleur position for the second sprocket; and a motion control circuit that provides a plurality of signals to move the derailleur from the first sprocket to the second sprocket. The plurality of signals comprises a first signal generated when the derailleur initially moves away from the first sprocket and a second signal generated when the derailleur is in close proximity to the second sprocket.

69 Claims, 7 Drawing Sheets

METHOD AND APPARATUS FOR CONTROLLING A BICYCLE TRANSMISSION

BACKGROUND OF THE INVENTION

The present invention is directed to bicycles and, more particularly, to a method and apparatus for controlling a bicycle transmission.

A typical bicycle transmission may include a plurality of front sprockets that rotate with the pedal cranks, a plurality of rear sprockets that rotate with the rear wheel, and a chain that engages one of the front sprockets and one of the rear sprockets. A front derailleur may be mounted to the bicycle frame for shifting the chain among the plurality of front sprockets, and a rear derailleur may be mounted to the bicycle frame for shifting the chain among the plurality of rear sprockets. Manually operated switches or levers may control the front and rear derailleurs. More sophisticated systems use small electric motors to control the bicycle transmission. The motors may be controlled manually by the foregoing switches or levers, or automatically based on bicycle speed and/or cadence.

When shifting the chain from a first sprocket to a second sprocket, it is known that the position of the rear derailleur relative to the second sprocket needed to catch the chain on the second sprocket varies depending on the design of the derailleur, the design of the chain, the design of the sprockets, and even how fast the derailleur moves. Some derailleur transmissions shift "early" in that the chain catches the second sprocket before the derailleur is aligned with the second sprocket, while other derailleurs shift "late" in that the derailleur must be moved beyond the second sprocket before the chain catches the second sprocket. In either case, the derailleur usually is aligned with the second sprocket after the chain catches the second sprocket. Correctly moving the derailleur to accommodate these requirements is a challenge when designing motor-controlled transmissions.

SUMMARY OF THE INVENTION

The present invention is directed to a method and apparatus for controlling the operation of a bicycle transmission, and particularly a derailleur transmission. In one embodiment of the present invention, an apparatus for moving an electrically controlled bicycle derailleur from a first sprocket to a second sprocket comprises a derailleur position input for receiving a signal indicating a position of the derailleur; a memory storing a first reference derailleur position for the second sprocket; and a motion control circuit that provides a plurality of signals to move the derailleur from the first sprocket to the second sprocket. The plurality of signals comprises a first signal generated when the derailleur initially moves away from the first sprocket and a second signal generated when the derailleur is in close proximity to the second sprocket. If desired, the first signal may comprise a drive signal, and the second signal may comprise a deceleration signal.

In a more specific embodiment, the plurality of signals may further comprise a third signal to position the derailleur at the first reference derailleur position, wherein the first reference derailleur position may be a position aligned with the second sprocket. The memory may store a second reference derailleur position and a third reference derailleur position, wherein the motion control circuit generates the second and third signals when the derailleur is at the second and third reference derailleur positions, respectively. In some embodiments the second reference derailleur position may correspond to a position wherein the derailleur is aligned with the second sprocket, whereas in other embodiments the second reference derailleur position may correspond to a position wherein the derailleur is spaced apart from the second sprocket. The third reference position is usually, but not necessarily, spaced apart from the second sprocket, either between the first and second sprockets or outside the range between the first and second sprockets. The memory may be a volatile or nonvolatile memory, and the reference derailleur positions may be predetermined or calculated in real time.

DETAILED DESCRIPTION OF THE EMBODIMENTS

Figure 1:
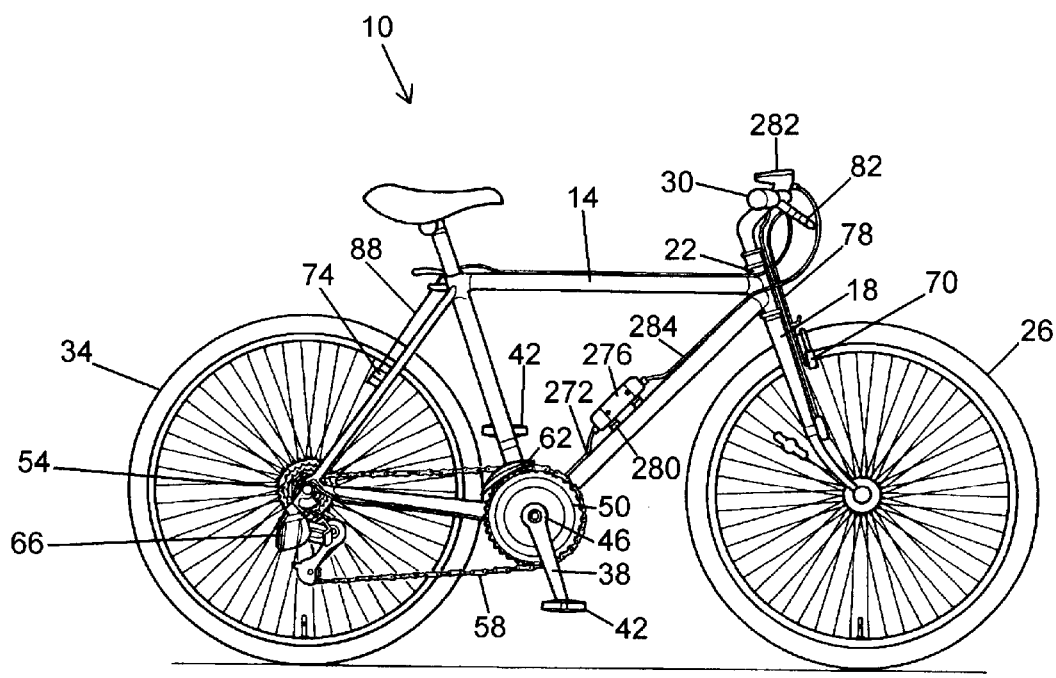
FIG. 1 is a side view of a bicycle that includes a particular embodiment of an apparatus for controlling a bicycle transmission according to the present invention.

FIG. 1 is a side view of a bicycle 10 that includes a particular embodiment of an apparatus 12 (FIG. 4) according to the present invention for controlling a bicycle transmission. Bicycle 10 has a frame 14, a front fork 18 rotatably supported in a head tube 22 of frame 14, a front wheel 26 rotatably supported by fork 18, a handlebar 30 for rotating fork 18 (and hence front wheel 26) in the desired direction, and a rear wheel 34 rotatably supported at the rear of frame 14. A pair of crank arms 38, each supporting a pedal 42, are mounted to an axle 46 that is rotatably supported in a lower portion of frame 14. A plurality of front sprockets 50 are mounted to the right side crank arm 38 for rotating with the right side crank arm 38, and a plurality of rear sprockets 54 are mounted to the rear wheel 34 for rotating with rear wheel 34. A chain 58 engages one of the front sprockets 50 and one of the rear sprockets 54. A front derailleur 62 is mounted to frame 14 in close proximity to the plurality of front sprockets 50 for moving chain 58 among the plurality of front sprockets 50, and a rear derailleur 66 is mounted to frame 14 in close proximity to the plurality of rear sprockets 54 for moving chain 58 among the plurality of rear sprockets 54. A front braking unit 70 is mounted to fork 18 for braking front wheel 26, and a rear braking unit 74 is mounted to the rear of frame 14 for braking rear wheel 34. Front braking unit 70 is connected to a Bowden-type control cable 78 that is connected to a brake lever assembly 82 mounted on the right side of handlebar 30. Similarly, rear braking unit 74 is connected to a Bowden-type control cable 88 that is connected to a brake lever assembly (not shown) mounted on the left side of handlebar 30.

Figure 2:
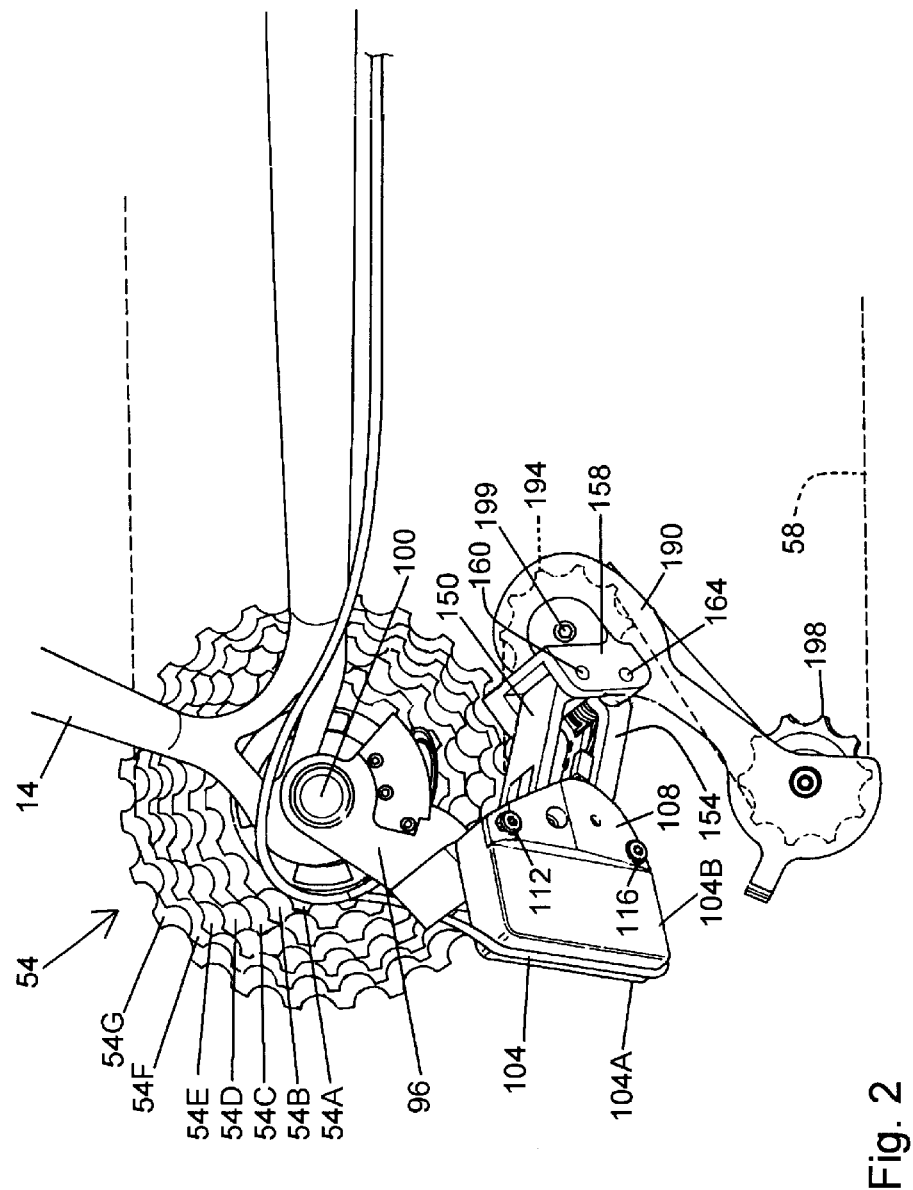
FIG. 2 is a more detailed view of the rear derailleur assembly.
Figure 3:
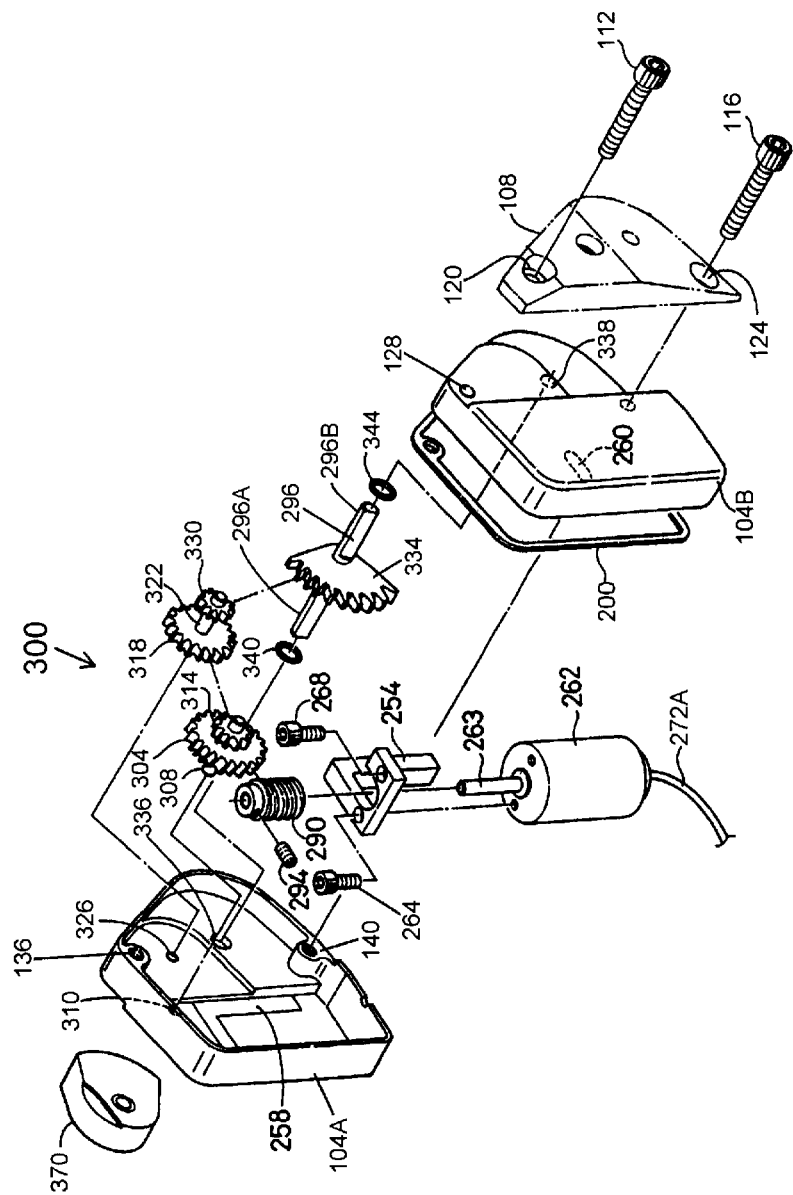
FIG. 3 is an exploded view of the motor assembly used to control the position of the derailleur.

As shown in FIG. 2, sprocket assembly 54 comprises plurality of sprockets 54(A–G) coaxially and rotatably mounted around an axle (not shown). In this embodiment, derailleur 66 is constructed according to the teachings of U.S. Pat. No. 6,162,140. More specifically, derailleur 66 includes a base member 96 with an axle opening (not shown) so that derailleur 66 may be mounted to frame 14 by passing the axle through the axle opening and screwing a nut 100 onto the axle. As shown in FIGS. 2 and 3, a motor unit housing 104 having housing sections 104A and 104B and a motor unit cover 108 are attached to base member 96 by inserting screws 112 and 116 through respective openings 120 and 124 in motor unit cover 108, through respective openings 128 and 132 in housing section 104B, through respective openings 136 and 140 in housing section 104A and into threaded openings (not shown) in base member 96.

One end each of link members 150 and 154 are pivotably coupled to base member 96 and motor unit 104 in a manner disclosed in the foregoing patent. The other ends of link members 150 and 154 are pivotably connected to a movable member 158 by respective pivot shafts 160 and 164. Thus, motor unit housing 104, link members 150 and 154, and movable member 158 form a "four-bar" type linkage mechanism so that movable member 158 moves relative to base member 96 and motor unit housing 104. A chain guide 190 having a guide pulley 194 and a tension pulley 198 is pivotably mounted to movable member 158 through a pivot shaft 199 in a known manner for switching a chain 58 among the plurality of sprockets 54(A–G).

As shown in FIG. 3, motor unit housing 104 includes housing sections 104A and 104B and a gasket 200 between housing section 104A and housing section 104B. Disposed within motor unit housing 104 is a mounting bracket 254 that seats within a groove 258 formed in first housing section 104A and a groove 260 formed in second housing section 104B. A motor 262 having a drive shaft 263 is rigidly fixed to mounting bracket 254 by screws 264 and 268. Motor 262 is controlled by signals received over a communication path 272A, which forms part of an overall communication path 272 connected to a motor control unit 12 (FIG. 1) which, in turn, is attached to frame 22 through a mounting bracket 280. Motor control unit 276 further communicates with a control center 282 mounted on handlebar 30 through a communication path 284.

A worm gear 290 is fixed to drive shaft 263 by a set screw 294 for driving a pivot shaft 296 through a gear reduction unit 300 and a fan gear 334. Gear reduction unit 300 includes a larger diameter gear 304 that meshes with worm gear 290. Larger diameter gear 304 is pivotably mounted to first housing section 104A through a pivot shaft 308 seated in a recess 310 formed in housing section 104A. A smaller diameter gear 314 is coaxially fixed to larger diameter gear 304 and meshes with another larger diameter gear 318. Larger diameter gear 318 is pivotably mounted to first housing section 104A through a pivot shaft 322 that seats in a recess 326 formed in first housing section 104A. A smaller diameter gear 330 is coaxially fixed to pivot shaft 322 and meshes with the fan gear 334 that is nonrotatably fixed to pivot shaft 296. Pivot shaft 296 has a shaft section 296A that extends through an opening 336 in first housing section 104A and a shaft section 296B that extends through an opening 338 in second housing section 104B. O-ring seals 340 and 344 are disposed around pivot shaft sections 296A and 296B, respectively, for preventing contaminants from entering motor unit housing 104 through openings 336 and 338. Link member 154 straddles fan gear 334 and is fixed to section 296A and 296B so that link member 154, and hence movable member 158, moves in response to movement of motor 262.

In operation, motor 262 rotates pivot shaft 296 counterclockwise through gear reduction unit 300 to cause chain guide 190 to switch chain 58 from a larger diameter sprocket 28(A–G) to a smaller diameter sprocket 28(A–G), and motor 262 rotates pivot shaft 296 clockwise through gear reduction unit 300 to cause chain guide 190 to switch chain 58 from a smaller diameter sprocket 28(A–G) to a larger diameter sprocket 28(A–G). A potentiometer 370 is fitted to shaft section 296A of pivot shaft 296 to determine the rotational position of pivot shaft 296, and hence link member 154, movable member 158 and chain guide 190. Potentiometer 370 thus provides a signal indicating the position of derailleur 66.

Figure 4:
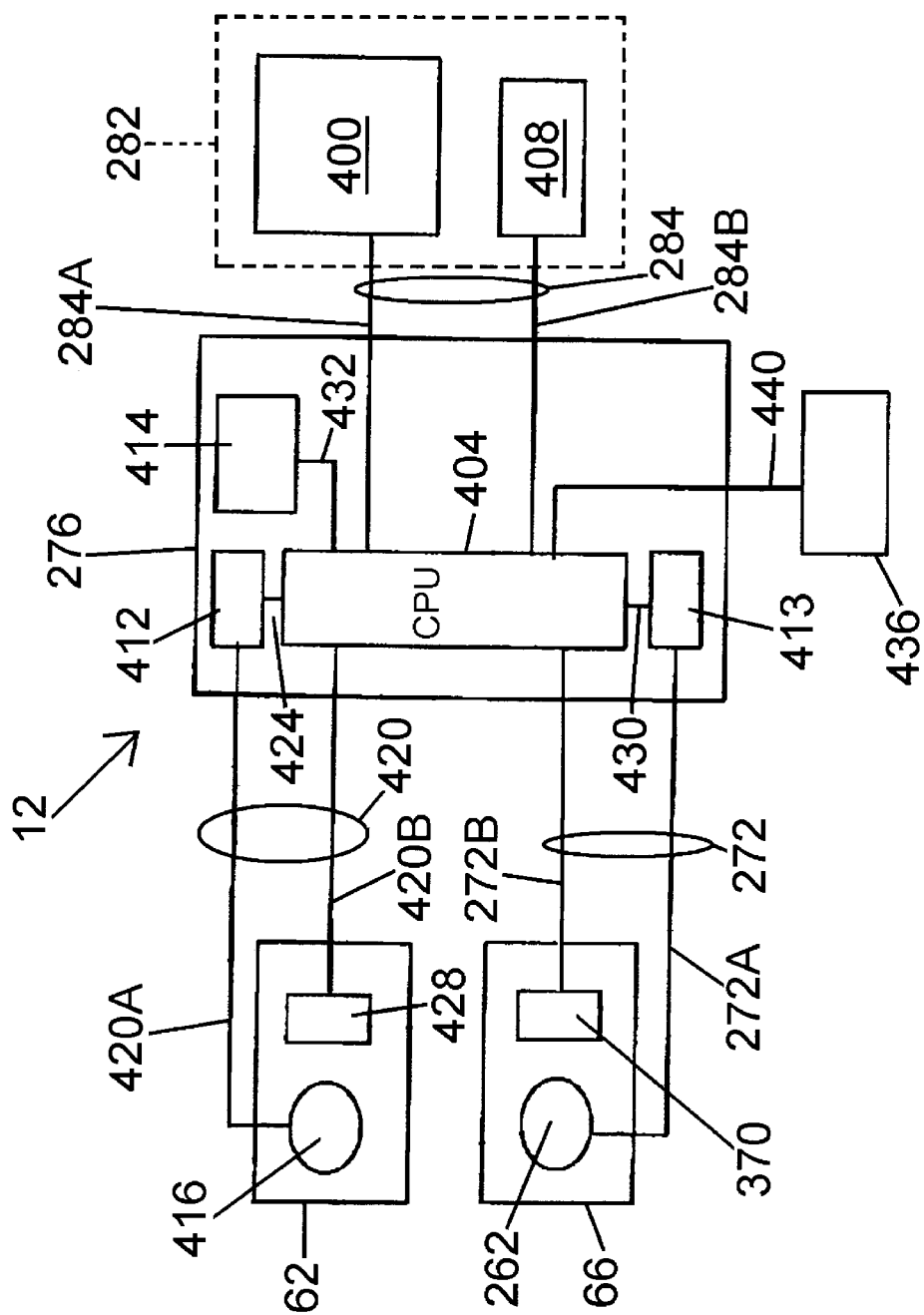
FIG. 4 is a block diagram of a particular embodiment of the apparatus for controlling a bicycle transmission according to the present invention.

FIG. 4 is a block diagram of a particular embodiment of the circuit components used in apparatus 12. As noted previously, motor control unit 276 communicates with a command center 282 through a communication path 284. Command center 282 typically includes a display unit 400 that communicates with a processor 404 in motor control unit 276 though a communication path 284A, and a switch unit 408 that communicates with processor 404 through a communication path 284B. Display unit 400 typically displays information to the rider such as riding speed, cadence, which sprockets are engages by chain 58, and so on. Switch unit 408 contains one or more switches or other devices for entering commands to processor 404. Communication paths 284A and 284B together comprise communication path 284.

Motor control unit 276 further includes a motor driver 412 which functions as a motion control circuit for front derailleur 62, a motor driver 413 which functions as a motion control circuit for rear derailleur 66, and a memory 414. Motor driver 412 communicates with a motor 416 associated with front derailleur 62 through a communication path 420A, and with processor 404 through a communication path 424. Processor 404 communicates with a position detecting potentiometer 428 associated with front derailleur 62 through a communication path 420B. Communication paths 420A and 420B together form part of a communication path 420. Similarly, motor driver 413 communicates with the aforementioned motor 262 associated with rear derailleur 66 through the communication path 272A, and with processor 404 through a communication path 430. Processor 404 communicates with the aforementioned potentiometer 370 through a communication path 272B. Communication paths 272A and 272B together form part of the communication path 272. Processor 404 receives operating power from a conventional hub dynamo 436 through a communication path 440.

Memory 414 communicates with processor 404 through a communication path 432, and it is used to store programming for processor 404 as well as other information (discussed below) used to control the operation of front derailleur 62 and rear derailleur 66. As readily recognized by one of ordinary skill in the art, memory 414 could be static or dynamic, volatile or nonvolatile, individual registers loaded during the operation of the device, or any software or hardware, temporary or permanent storage technique. In other words, the values stored in memory 414 could be predetermined or calculated in real time (in which case memory 414 may consist of a register in the program). With these considerations, potentiometer 370 also could be considered part of memory 414.

Figure 5:
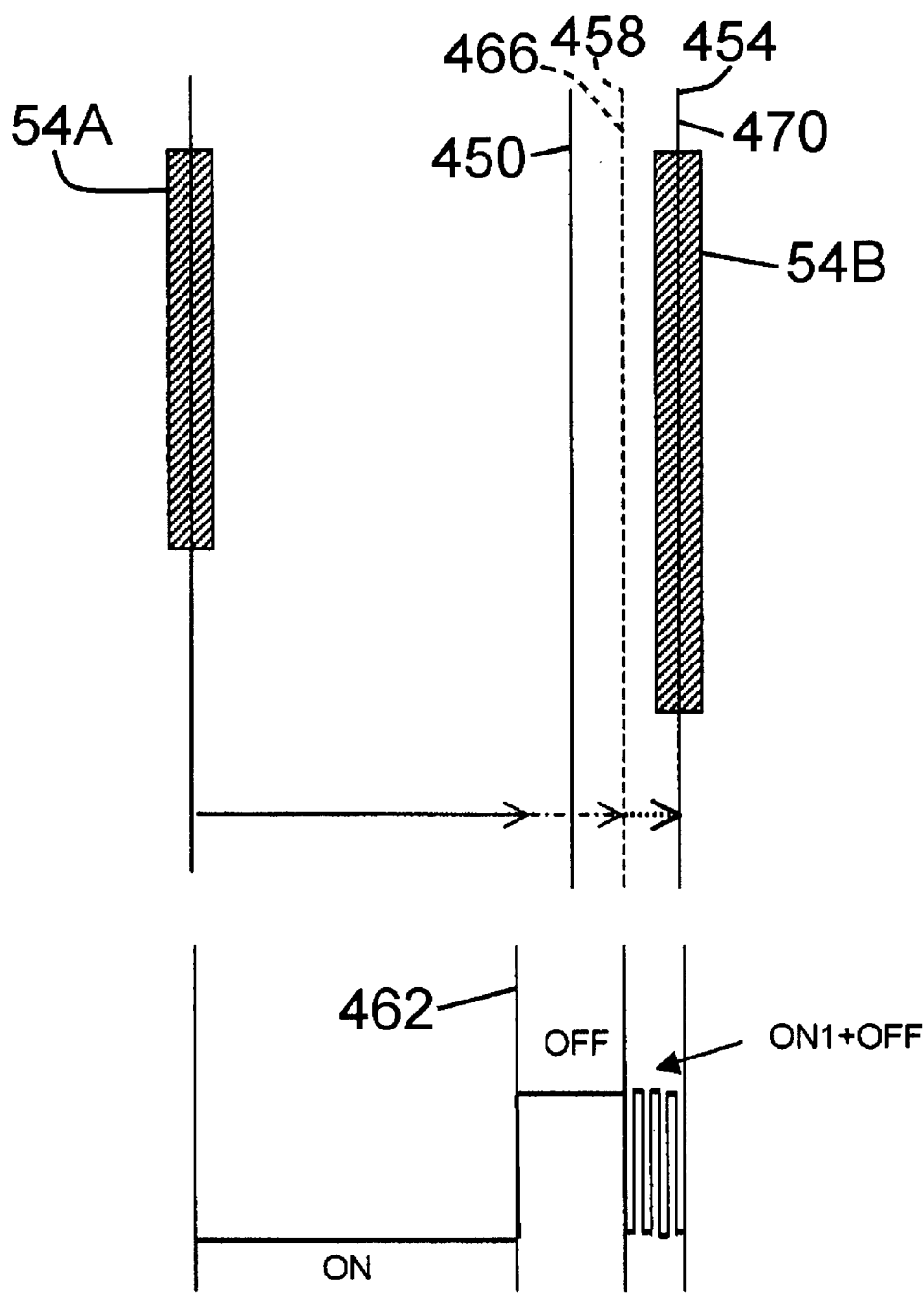
FIG. 5 illustrates the signals produced for different derailleur positions by a first embodiment of an apparatus according to the present invention.

FIG. 5 illustrates the signals produced by apparatus 12 when rear derailleur 66 moves from a first sprocket (e.g., sprocket 54A) to a second sprocket (e.g., sprocket 54B). In this embodiment, rear sprockets 54, chain 58 and rear derailleur 66 are constructed so as to be capable of early shifting. More specifically, there is a range between a chain guide position 450 and a chain guide position 454 where chain 58 is likely to catch sprocket 54B, with an ideal chain guide position 458 where chain 58 usually catches sprocket 54B. Chain guide positions 450 and 458 both are located between sprockets 54A and 54B and are spaced apart from sprockets 54A and 54B. In general, a signal ON is generated to move chain guide 190 initially away from sprocket 54A. A signal OFF and/or a signal ON+OFF is generated when potentiometer 370 provides a signal indicating that chain guide 190 is in close proximity to sprocket 54B. In this embodiment, signal ON is a continuous signal that functions as a drive signal. Signal OFF is a continuous signal that is generated when chain guide 190 is at a reference derailleur position 462, and it functions as a deceleration signal. In this embodiment, reference derailleur position 462 is located between sprockets 54A and 54B and is spaced apart from sprocket 54B. Signal ON+OFF is an intermittent signal generated when chain guide 190 is at a reference derailleur position 466. In this embodiment, reference derailleur position 466 coincides with ideal chain guide position 458, and it is used to fine tune the position of chain guide 190 to reach a reference derailleur position 470 which, in this embodiment, aligns with sprocket 54B. The timing of the signals in this embodiment is such that chain guide 190 will begin decelerating before is reaches the range set by positions 450 and 454. When chain guide 190 reaches the ideal chain guide position 458, it assumed that chain 58 has successfully engaged sprocket 54B, and chain guide 190 is stepped to the position beneath sprocket 54B. If chain 58 in fact did not catch sprocket 54B at the reference derailleur position 466, then the stepping also allows chain 58 to engage sprocket 54B.

As noted above, memory 414 could be a typical mass storage device or even a register that is temporarily loaded during execution of the control program. Thus, the reference derailleur positions may be predetermined or calculated in real time. For example, memory 14 may store reference derailleur position 470, and processor 404 may calculate reference derailleur position 462 from reference derailleur position 470 in real time. Reference derailleur position 466 also may be predetermined or calculated in real time, or it may be even the position indicated by potentiometer 370 after chain guide 190 stops in response to signal OFF. The reference derailleur positions also may be determined through a learning function based on previous shifting results. The various signals may be generated immediately when the derailleur is at the corresponding reference derailleur positions, or after a certain delay. For example, signal ON+OFF may be delayed for a period of 2.5 revolutions of crank arms 38 after derailleur reaches reference position 466.

Figure 6:
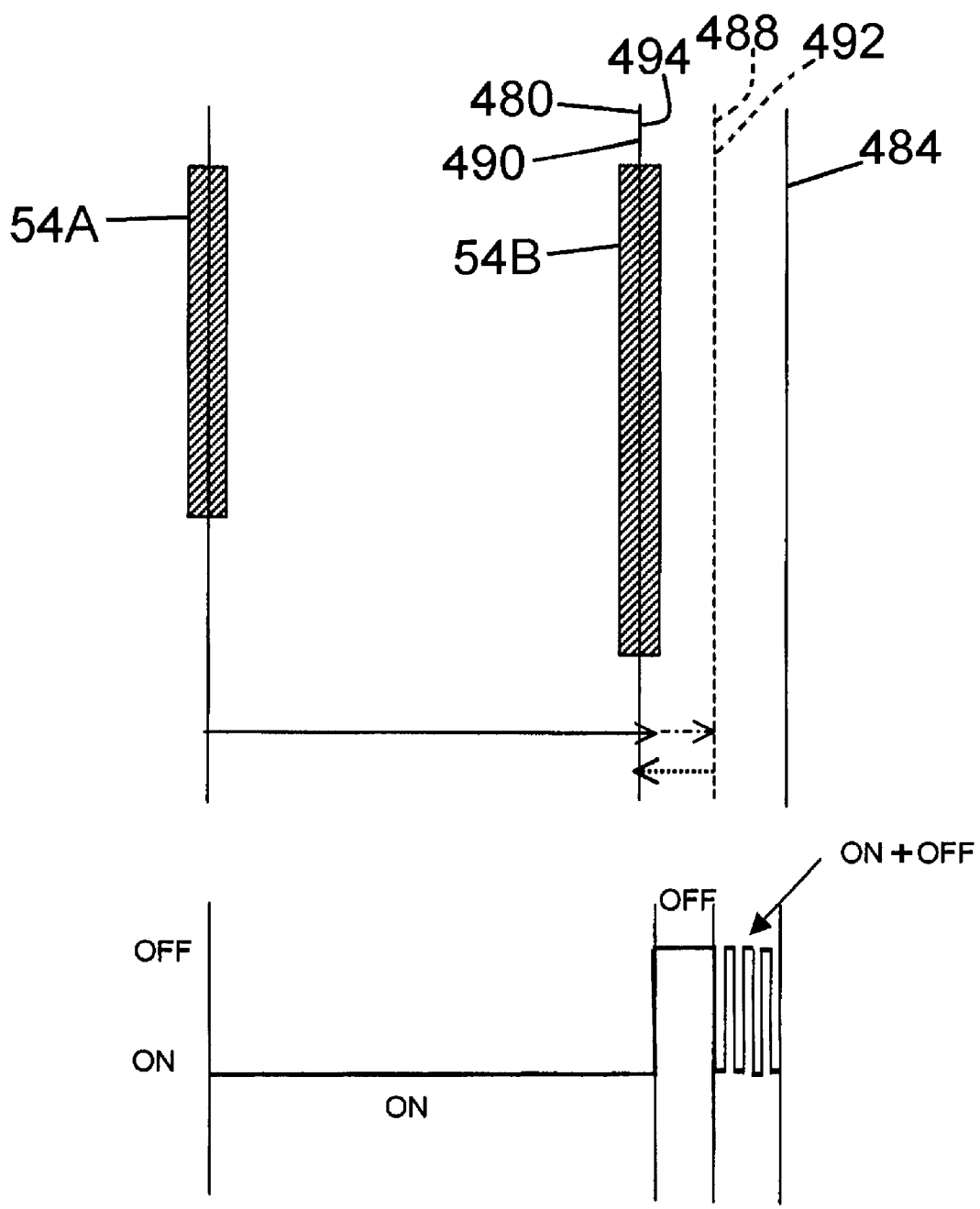
FIG. 6 illustrates the signals produced for different derailleur positions by a second embodiment of an apparatus according to the present invention.

FIG. 6 illustrates the signals produced by apparatus 12 when rear derailleur 66 moves from a first sprocket (e.g., sprocket 54A) to a second sprocket (e.g., sprocket 54B) in a second embodiment of the present invention. In this embodiment, rear sprockets 54, chain 58 and rear derailleur 66 are constructed so as to operate by late shifting. More specifically, there is a range between a chain guide position 480 and a chain guide position 484 where chain 58 is likely to catch sprocket 54B, with an ideal chain guide position 488 where chain 58 usually catches sprocket 54B. Chain guide position 484 and 488 both are located outside the range between sprockets 54A and 54B and are spaced apart from sprockets 54A and 54B. As in the first embodiment, a signal ON is generated to move chain guide 190 initially away from sprocket 54A, and signal OFF and/or a signal ON+OFF are generated when chain guide 190 is in close proximity to sprocket 54B. As in the first embodiment, signal ON is a continuous signal that functions as a drive signal, and signal OFF is a continuous signal that functions as a deceleration signal. In this embodiment, signal OFF is generated when chain guide 190 is at a reference derailleur position 490 that aligns with sprocket 54B. Signal ON+OFF is an intermittent signal generated when chain guide 190 is at a reference derailleur position 492 which, in this embodiment, coincides with ideal chain guide position 488, and it is used to reverse the direction of chain guide 190 and fine tune the position of chain guide 190 to reach a reference derailleur position 494 which, in this embodiment, aligns with sprocket 54B. The timing of the signals in this embodiment is such that chain guide 190 will begin decelerating as it passes sprocket 54B. When chain guide 190 reaches the ideal chain guide position 488, it is again assumed that chain 58 has successfully engaged sprocket 54B, and chain guide 190 is stepped to the position beneath sprocket 54B at the appropriate time.

Figure 7:
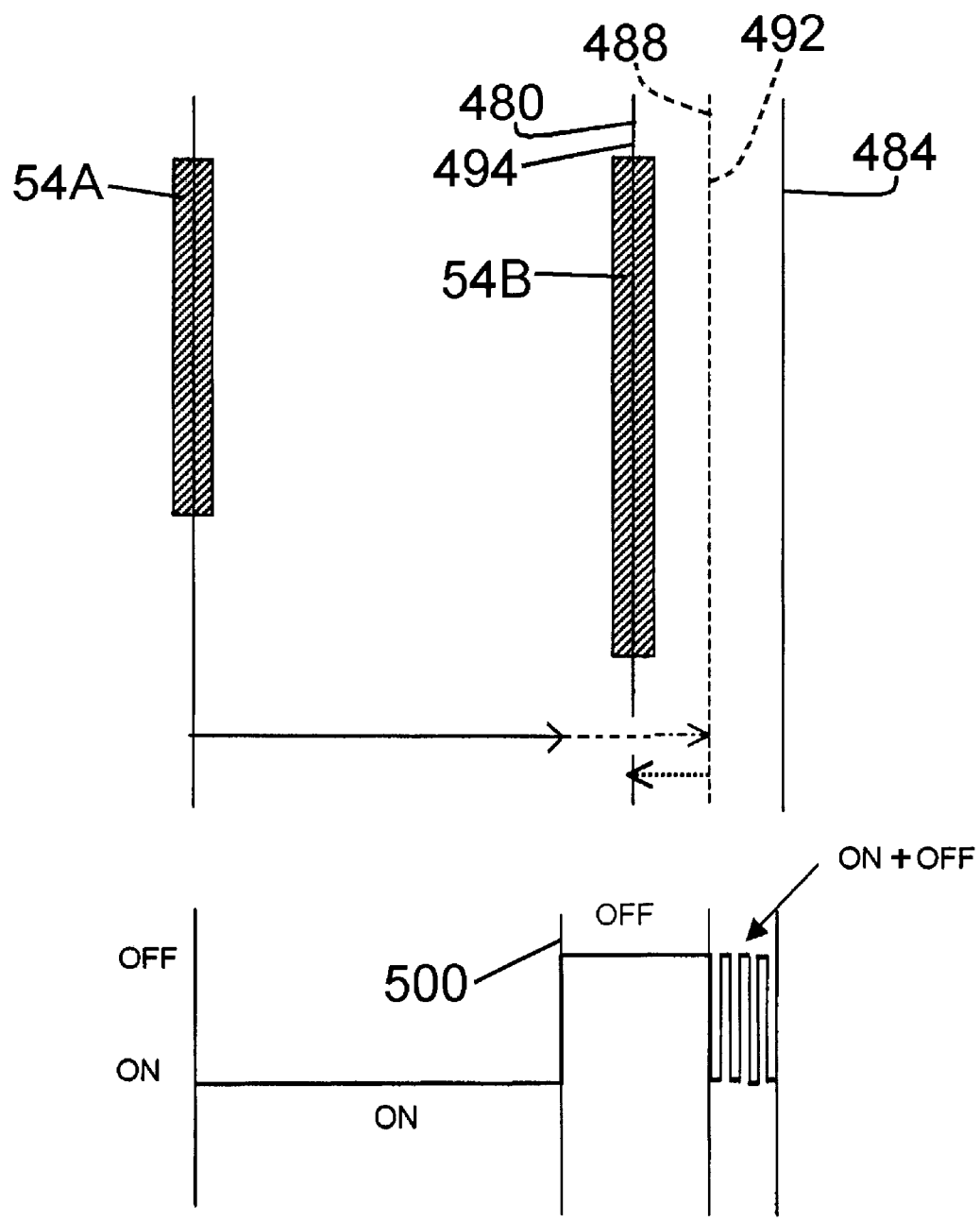
FIG. 7 illustrates the signals produced for different derailleur positions by a third embodiment of an apparatus according to the present invention.

FIG. 7 illustrates the signals produced by apparatus 12 when rear derailleur 66 moves from a first sprocket (e.g., sprocket 54A) to a second sprocket (e.g., sprocket 54B) in a third embodiment of the present invention. In this embodiment, rear sprockets 54, chain 58 and rear derailleur 66 again are constructed so as to operate by late shifting. As in the second embodiment, there is a range between a chain guide position 480 and a chain guide position 484 where chain 58 is likely to catch sprocket 54B, with an ideal chain guide position 488 where chain 58 usually catches sprocket 54B. Chain guide positions 484 and 488 both are located outside the range between sprockets 54A and 54B and are spaced apart from sprockets 54A and 54B. As in the other embodiments, a signal ON is generated to move chain guide 190 initially away from sprocket 54A, and a signal OFF and/or a signal ON+OFF are generated when chain guide 190 is in close proximity to sprocket 54B. As in the other embodiments, signal ON is a continuous signal that functions as a drive signal, and signal OFF is a continuous signal that functions as a deceleration signal. In this embodiment, signal OFF is generated when chain guide 190 is at a reference derailleur position 500 that is located between sprockets 54A and 54B and is spaced apart from sprocket 54B. As in the second embodiment, signal ON+OFF is an intermittent signal generated when chain guide 190 is at a reference derailleur position 492 which coincides with ideal chain guide position 488, and it is used to fine tune the position of chain guide 190 to reach a reference derailleur position 494 which aligns with sprocket 54B. The timing of the signals in this embodiment is such that chain guide 190 will begin decelerating before it reaches sprocket 54B, and fine tune positioning begins after chain guide 190 passes sprocket 54B. When chain guide 190 reaches the ideal chain guide position 488, it is again assumed that chain 58 has successfully engaged sprocket 54B, and chain guide 190 is stepped to the position beneath sprocket 54B at the appropriate time.

While the above is a description of various embodiments of the present invention, further modifications may be employed without departing from the spirit and scope of the present invention. For example, the size, shape, location or orientation of the various components may be changed as desired. Components that are shown directly connected or contacting each other may have intermediate structures disposed between them. Although the motion control circuit generated single signals in the described embodiments, multiple parallel and/or sequential signals can be used to control the derailleur. The timing of the signals can be adjusted to suit the application, and the signals may be continuous, intermittent, ramped, or some other configuration.

The functions of one element may be performed by two, and vice versa. The structures and functions of one embodiment may be adopted in another embodiment. The teachings of the present invention may be applied to the front derailleur and to other types of transmissions. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus on a particular structure or feature.

What is claimed is:

1. An apparatus for moving an electrically controlled bicycle derailleur from a first sprocket to a second sprocket comprising:
   a derailleur position input for receiving a signal indicating a position of the derailleur;
   a memory storing a first reference derailleur position for the second sprocket;
   a motion control circuit that provides a plurality of signals to move the derailleur from the first sprocket to the second sprocket, wherein the plurality of signals comprise:
      a first signal generated to move the derailleur initially away from the first sprocket; and
      a second signal generated automatically when the derailleur reaches a predetermined position in close proximity to the second sprocket to move the derailleur differently from movement caused by the first signal to complete movement of the derailleur to the second sprocket.

2. The apparatus according to claim 1 wherein the first signal comprises a continuous signal.

3. The apparatus according to claim 2 wherein the second signal comprises a continuous signal.

4. The apparatus according to claim 1 wherein the second signal comprises a continuous signal.

5. The apparatus according to claim 1 wherein the second signal comprises an intermittent signal.

6. The apparatus according to claim 1 wherein the first signal comprises a continuous signal, and wherein the second signal comprises an intermittent signal.

7. The apparatus according to claim 1 wherein the first signal comprises a drive signal, and wherein the second signal comprises a deceleration signal.

8. The apparatus according to claim 7 wherein the first signal comprises a continuous signal.

9. The apparatus according to claim 8 wherein the second signal comprises a continuous signal.

10. The apparatus according to claim 1 wherein the first signal comprises a drive signal, and wherein the second signal is generated to position the derailleur at the first reference derailleur position.

11. The apparatus according to claim 10 wherein the first signal comprises a continuous signal.

12. The apparatus according to claim 10 wherein the second signal comprises an intermittent signal.

13. The apparatus according to claim 10 wherein the first signal comprises a continuous signal, and wherein the second signal comprises an intermittent signal.

14. The apparatus according to claim 10 wherein the first reference derailleur position corresponds to a position wherein the derailleur is aligned with the second sprocket.

15. The apparatus according to claim 1 wherein the plurality of signals further comprise a third signal to position the derailleur at the first reference derailleur position.

16. The apparatus according to claim 15 wherein the third signal comprises an intermittent signal.

17. The apparatus according to claim 16 wherein the first signal comprises a continuous signal.

18. The apparatus according to claim 17 wherein the second signal comprises a continuous signal.

19. The apparatus according to claim 16 wherein the first signal comprises a drive signal, and wherein the second signal comprises a deceleration signal.

20. The apparatus according to claim 15 wherein the first reference derailleur position corresponds to a position wherein the derailleur is aligned with the second sprocket.

21. The apparatus according to claim 15 wherein the memory stores a second reference derailleur position, and wherein the motion control circuit generates the second signal when the derailleur is at the second reference derailleur position.

22. The apparatus according to claim 21 wherein the first reference derailleur position corresponds to a position wherein the derailleur is aligned with the second sprocket.

23. The apparatus according to claim 22 wherein the second reference derailleur position corresponds to a position wherein the derailleur is aligned with the second sprocket.

24. The apparatus according to claim 23 wherein the first signal comprises a continuous signal.

25. The apparatus according to claim 24 wherein the second signal comprises a continuous signal.

26. The apparatus according to claim 25 wherein the third signal comprises an intermittent signal.

27. The apparatus according to claim 23 wherein the second signal comprises a continuous signal.

28. The apparatus according to claim 23 wherein the third signal comprises an intermittent signal.

29. The apparatus according to claim 23 wherein the first signal comprises a continuous signal, and wherein the third signal comprises an intermittent signal.

30. The apparatus according to claim 23 wherein the first signal comprises a drive signal, and wherein the second signal comprises a deceleration signal.

31. The apparatus according to claim 23 wherein the memory stores a third reference derailleur position, wherein the third signal is generated when the derailleur is at the third reference derailleur position.

32. The apparatus according to claim 31 wherein the third reference derailleur position corresponds to a location outside a range between the first sprocket and the second sprocket.

33. The apparatus according to claim 32 wherein the third reference derailleur position corresponds to a location in close proximity to the second sprocket.

34. The apparatus according to claim 33 wherein the first signal comprises a continuous signal.

35. The apparatus according to claim 34 wherein the second signal comprises a continuous signal.

36. The apparatus according to claim 35 wherein the third signal comprises an intermittent signal.

37. The apparatus according to claim 33 wherein the second signal comprises a continuous signal.

38. The apparatus according to claim 33 wherein the third signal comprises an intermittent signal.

39. The apparatus according to claim 33 wherein the first signal comprises a continuous signal, and wherein the third signal comprises an intermittent signal.

40. The apparatus according to claim 33 wherein the first signal comprises a drive signal, and wherein the second signal comprises a deceleration signal.

41. The apparatus according to claim 22 wherein the second reference derailleur position corresponds to a position wherein the derailleur is spaced apart from the second sprocket.

42. The apparatus according to claim 41 wherein the second reference derailleur position corresponds to a location between the first sprocket and the second sprocket.

43. The apparatus according to claim 42 wherein the second reference derailleur position corresponds to a location in close proximity to the second sprocket.

44. The apparatus according to claim 43 wherein the first signal comprises a continuous signal.

45. The apparatus according to claim 44 wherein the second signal comprises a continuous signal.

46. The apparatus according to claim 45 wherein the third signal comprises an intermittent signal.

47. The apparatus according to claim 43 wherein the second signal comprises a continuous signal.

48. The apparatus according to claim 43 wherein the third signal comprises an intermittent signal.

49. The apparatus according to claim 43 wherein the first signal comprises a continuous signal, and wherein the third signal comprises an intermittent signal.

50. The apparatus according to claim 43 wherein the first signal comprises a drive signal, and wherein the second signal comprises a deceleration signal.

51. The apparatus according to claim 43 wherein the memory stores a third reference derailleur position, wherein the third signal is generated when the derailleur is at the third reference derailleur position.

52. The apparatus according to claim 51 wherein the third reference derailleur position corresponds to a location between the first sprocket and the second sprocket.

53. The apparatus according to claim 52 wherein the third reference derailleur position corresponds to a location in close proximity to the second sprocket.

54. The apparatus according to claim 53 wherein the first signal comprises a continuous signal.

55. The apparatus according to claim 54 wherein the second signal comprises a continuous signal.

56. The apparatus according to claim 55 wherein the third signal comprises an intermittent signal.

57. The apparatus according to claim 53 wherein the second signal comprises a continuous signal.

58. The apparatus according to claim 53 wherein the third signal comprises an intermittent signal.

59. The apparatus according to claim 53 wherein the first signal comprises a continuous signal, and wherein the third signal comprises an intermittent signal.

60. The apparatus according to claim 53 wherein the first signal comprises a drive signal, and wherein the second signal comprises a deceleration signal.

61. The apparatus according to claim 51 wherein the third reference derailleur position corresponds to a location outside a range between the first sprocket and the second sprocket.

62. The apparatus according to claim 61 wherein the third reference derailleur position corresponds to a location in close proximity to the second sprocket.

63. The apparatus according to claim 62 wherein the first signal comprises a continuous signal.

64. The apparatus according to claim 63 wherein the second signal comprises a continuous signal.

65. The apparatus according to claim 64 wherein the third signal comprises an intermittent signal.

66. The apparatus according to claim 62 wherein the second signal comprises a continuous signal.

67. The apparatus according to claim 62 wherein the third signal comprises an intermittent signal.

68. The apparatus according to claim 62 wherein the first signal comprises a continuous signal, and wherein the third signal comprises an intermittent signal.

69. The apparatus according to claim 62 wherein the first signal comprises a drive signal, and wherein the second signal comprises a deceleration signal.

* * * * *